(12) United States Patent
Seeley

(10) Patent No.: US 6,739,759 B1
(45) Date of Patent: May 25, 2004

(54) PROTECTED OPTICAL INTERFACE

(75) Inventor: Gregory Alan Seeley, Orange, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/388,708

(22) Filed: Mar. 13, 2003

(51) Int. Cl.[7] .................................................. G02B 6/38
(52) U.S. Cl. ........................................ 385/60; 439/589
(58) Field of Search ............................... 385/60, 66, 70, 385/72, 78; 439/271, 274, 275, 587, 589

(56) References Cited

U.S. PATENT DOCUMENTS

| | | | |
|---|---|---|---|
| 4,140,366 A | 2/1979 | Makuch et al. | 350/96.22 |
| 4,140,367 A | 2/1979 | Makuch et al. | 350/96.22 |
| 4,193,655 A * | 3/1980 | Herrmann, Jr. | 439/166 |
| 4,801,191 A | 1/1989 | Nakai et al. | 350/96.2 |
| 5,362,258 A * | 11/1994 | Arnswald et al. | 439/695 |
| 5,408,557 A | 4/1995 | Hsu | 385/72 |
| 5,689,598 A | 11/1997 | Dean, Jr. et al. | 385/59 |
| 5,796,896 A * | 8/1998 | Lee | 385/59 |
| 5,870,515 A | 2/1999 | Ott et al. | 385/59 |
| 5,920,669 A | 7/1999 | Knecht et al. | 385/76 |
| 5,923,802 A | 7/1999 | Giebel et al. | 385/76 |
| 6,203,210 B1 * | 3/2001 | Mikula et al. | 385/78 |
| 6,206,579 B1 | 3/2001 | Selfridge et al. | 385/60 |
| 6,238,101 B1 * | 5/2001 | Chen et al. | 385/60 |
| 6,264,374 B1 | 7/2001 | Selfridge et al. | 385/78 |
| 6,298,190 B2 | 10/2001 | Waldron et al. | 385/134 |
| 6,623,289 B2 * | 9/2003 | Decicco | 439/271 |

* cited by examiner

Primary Examiner—Lynn Feild
Assistant Examiner—Thanh-Tam Le
(74) Attorney, Agent, or Firm—Roger C. Turner

(57) ABSTRACT

An optic fiber connector system which uses low cost plex components while providing sealing and physical protection approaching that of military type optical connectors. An assembly (70) of a plurality of shells includes a middle shell (72) with an internal flange (120) having a rectangular opening (122) that closely receives and is fixed to a plex housing (12). Front and rear backshells (80, 82) extend in opposite directions from the middle shell and surround optic fiber cables (32, 34) that trail from plex optic fiber connectors (20, 22), and with rubber grommets (110) sealed to the optic fiber cables.

6 Claims, 2 Drawing Sheets

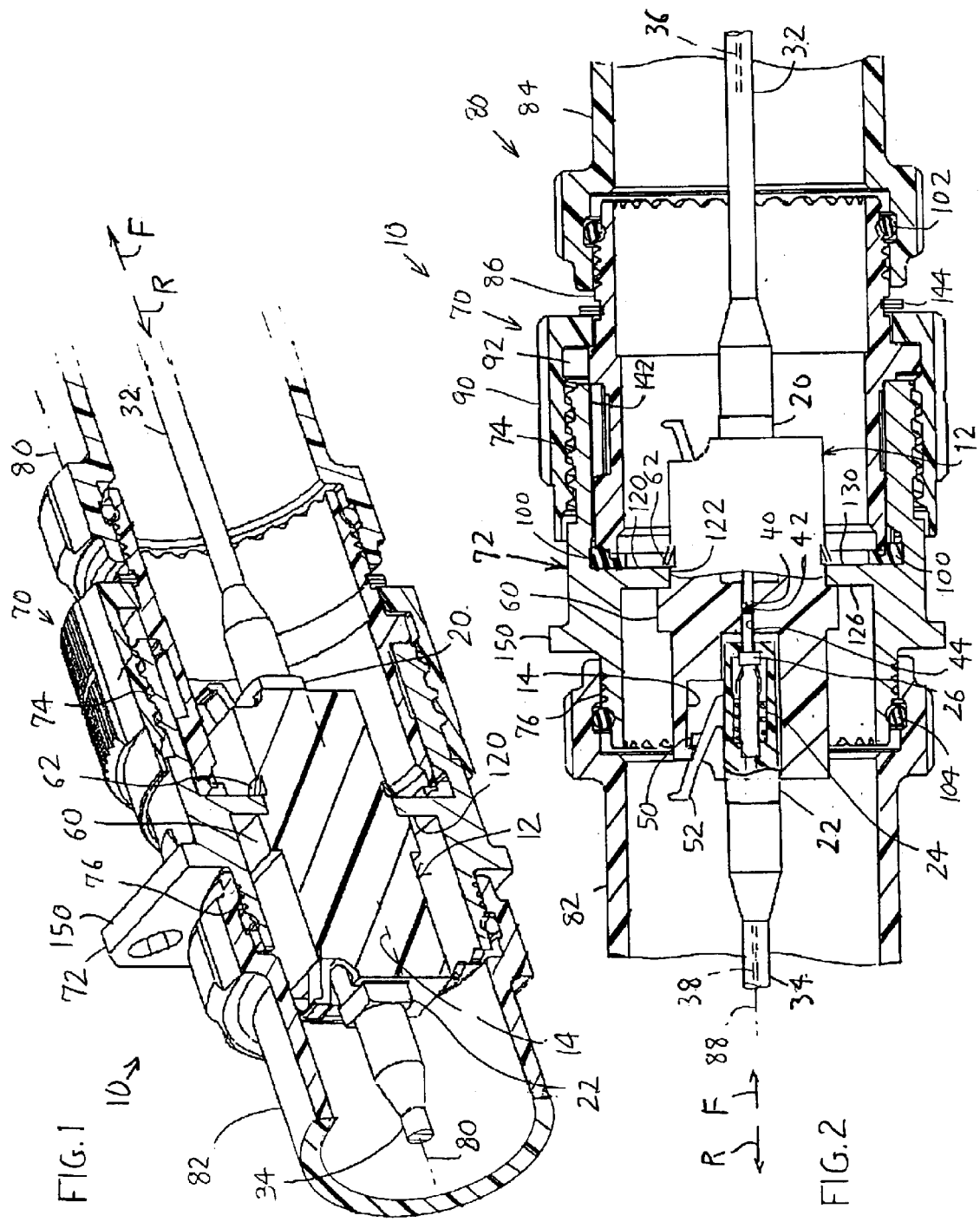

PROTECTED OPTICAL INTERFACE

BACKGROUND OF THE INVENTION

At present, there are two types of optical fiber connector systems in wide use; one is a low cost simple system that is referred to herein as the plex system, and the other is the military system. In the plex system, a plex housing is provided which has through bores with opposite ends. Each end receives an optic fiber plex connector, so the tips of fibers of the two connectors touch one another to transmit light between optic fiber cables that trail from the plex connectors. Each plex connector includes a plex frame with a through passage, and a terminus lying in the through passage, the optic fiber cable having a fiber that extends through the terminus. Each plex connector also includes a latch that holds it in a bore of a plex housing until the latch is released to withdraw the plex connector. This type of optic fiber connector system is of low cost and highly versatile. However, when used in a hostile environment, such as in a factory where solvent vapors or dust may reach the plex housing, or a drop of a corrosive chemical may be splattered onto the plex housing, the plex system is not satisfactory.

In a military-type optic fiber connector, two separate connectors are provided, each with a housing having multiple passages that each receives a terminus without a frame around it, with each terminus being removable only with a special tool. Often, one of the connectors holds alignment sleeves that align the termini. Metal shells surround each housing and an optic fiber cable extends from each terminus. When the two connectors are mated, the tips of multiple pairs of optical fibers abut one another. Also, the two mating shells are sealed to each other. The shells are also each sealed to each other around the corresponding housing and to the cables to provide physical protection and to keep out vapors and other possibly harmful material. While such military-style connectors provide reliable connections, they are expensive.

If an optical fiber connector system were available which provided much of the low cost and simple connections of a plex system, while providing at least some of the sealing and mechanical protection of a military system, such a system would find use in many somewhat hostile environments.

SUMMARY OF THE INVENTION

In accordance with one embodiment of the present invention, an optical fiber connector system is provided, which has many of the advantages of a plex system in providing low cost, versatile and simple optic fiber connections, and which also has some of the advantages of a military-style optic fiber connection system in providing sealing and physical protection. The system includes a plex housing with one or more bores having opposite ends that each receive a plex connector and forming an alignment bore portion that aligns ferrules of two mating plex connectors. The system also includes an assembly of shells, including a cylindrical middle shell that lies around the plex housing and that has an internal flange with a rectangular opening that closely receives the plex housing, the middle shell being fixed to the plex housing. The middle shell has front and rear ends that are each threaded, and that engage threaded ends of backshells that receive trailing optical fiber cables extending from the plex connectors. The shells are sealed to one another, and grommets at the ends of the backshells are sealed to the optic cables. The shells provide physical protection of the plex housing and plex connectors therein, and provide sealing against the entrance of vapor and the like into the region where the tips of optical fibers abut one another.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional view of an optic fiber connector system of the present invention, with a pair of plex connectors mounted in the plex housing.

FIG. 2 is a partial sectional side elevation view of the connector system of FIG. 1.

DESCRIPTION OF THE PREFERRED EMBODIMENT

Figure 3:
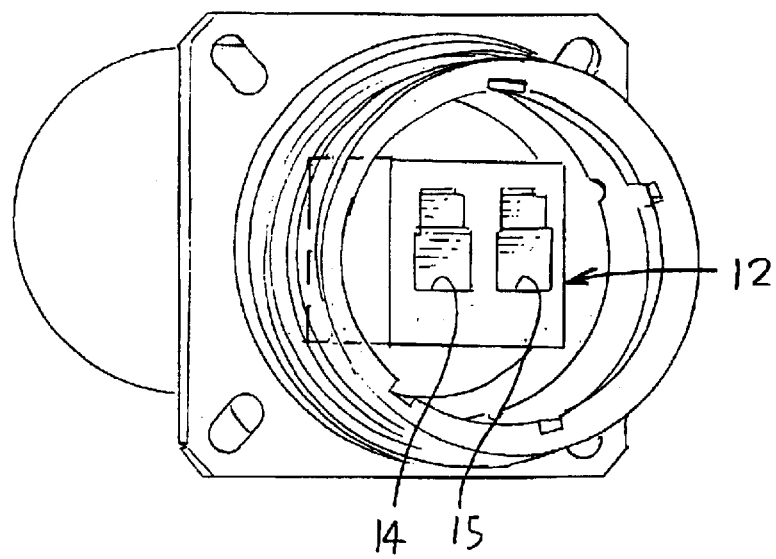
FIG. 3 is a front isometric view of the middle shell of the shell assembly of FIG. 2.

FIG. 1 illustrates an optic fiber connector system 10 of the present invention which includes a plex connector housing 12 that has at least one through bore 14 with opposite ends that each receives a plex connector 20, 22. The plex connectors are similar in shape to common telephone-type connectors that plug into household telephone wall sockets. The bore opposite ends are spaced in front F and rear R longitudinal directions. As shown in FIG. 2, each plex connector such as 22 includes a plex frame 23 that has a plex passage 24 that receives a plex terminus 26. The walls of the plex passage 24 are thin. Each plex connector is connected to an optical fiber cable 32, 34 which includes an optical fiber 36, 38. Each optical fiber extends completely through a corresponding terminus, and the tips 40, 42 of two fibers abut one another within an alignment sleeve portion 44 of the through bore 14. Each plex connector 20, 22 is locked in the through bore by a latch 50 that can be unlatched. In FIG. 2, unlatching is accomplished by depressing a handle 52.

The plex housing 12 is generally of rectangular cross-section, and can be fixed in a panel by an outer flange 60 and a flexible stop 62. Applicant uses the term "plex" to describe simple optic fiber systems, wherein each fiber generally lies in a separate connector frame that can be easily pushed into and pulled out of a plex housing bore. Such plex systems generally require a much greater volume for connecting many optic cables together, than military systems where a single housing has many bores that each receives a fiber-holding terminus, with a special tool required to remove a terminus. However, plex connectors are versatile in that they can be easily plugged into and removed from a plex housing, and spares are readily available.

The plex system itself, which includes the plex housing 12 and the pair of plex connectors 20, 22 are satisfactory for many applications where a panel on which the plex housing 12 is mounted lies in a clean environment. However, in a harsh environment, where the plex housing 12 may be struck or where there is a lot of dust or vapor in the air which might find its way into the plex housing bore 14, the plex system is not satisfactory. Another available system is the military optical fiber connector system, which is expensive.

In accordance with the present invention, applicant provides a moderately priced optical fiber connection system 10 which is based on a plex system that includes a low cost plex connector housing 12 and low cost and easily removed (without special tools) plex connectors 20, 22 that each forms its own frame with a terminus-receiving passage. Applicant adds an assembly 70 of shells that surround the plex housing 12, and that also surround the plex connectors 20, 22 that connect to each other in the connector housing and optic fiber cables 32, 34 that extend from the plex connectors. The shell assembly 70 includes a middle shell 72 that has externally threaded front and rear middle shell portions 74, 76. The shell assembly also includes front and rear backshells 80, 82 that respectively project forwardly and rearwardly from the middle shell 72. The shells are primarily of cylindrical shape with a shell axis 88. As shown in FIG. 2, the front backshell 80 includes a front backshell member 84, a plug barrel part 86 that serves as a rearward extension of the front backshell member 84, and a coupling nut 90. The backshell member 84 and rear backshell 82 can be identical.

Figure 4:
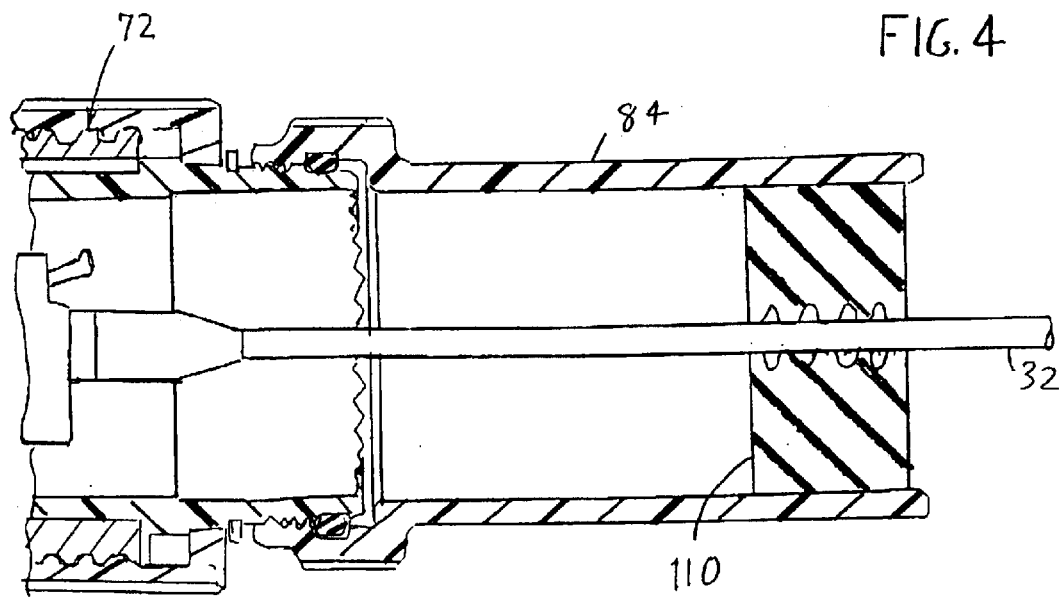
FIG. 4 is a partial side elevation view similar to that of FIG. 2, showing a grommet at the end of one of the backshells.

The coupling nut 90 threadably engages the front threaded end 74 of the middle shell and an outer flange 92 on the plug barrel part. When the coupling nut 90 is tightened, it pushes a shoulder 93 on the flange 92 rearward and causes the plug barrel 86 to compress a seal 100. Additional seals 102, 104 seal the shell members to one another. FIG. 4 shows that grommets 110 seal each optic fiber cable such as 32 to the corresponding backshell or backshell member such as 84.

The middle shell 72 (FIG. 2) has an internal flange 120 with a cylindrical radially outer part that merges with the rest of the middle shell, and with a rectangular passage 122 that closely receives the plex housing 12. The plex housing has flanges 60 that abut rearwardly-facing shoulders 126 of the middle shell flange. The plex housing also includes pop up latches 62 that abut an opposite forwardly-facing shoulder 130 of the middle shell internal flange.

As shown in FIG. 3, the particular plex housing 12 has two bores 14, 15 for connecting two pairs of mating plex connectors. A plex housing with one or with more than two bores is available, but this usually requires a larger shell assembly. It is noted that a military connector could hold perhaps ten or more optical terminii in the same space because it has a single housing with multiple bores.

The shell assembly 70 (FIG. 2) can be mounted on an existing or new plex system which includes the plex housing 12 and one or more pairs of plex connectors 20, 22 and corresponding optic fiber cables 32, 34 extending therefrom. With the middle shell 72 not connected to other parts, the plex housing is pushed forwardly F into the middle shell internal flange passage 122 until the latches 62 snap into place. The front backshell assembly or front backshell 80 is inserted into a front passageway portion 142 of the middle shell and the coupling nut 90 is held in place by a snap ring 144. The front backshell member 84 will have been already screwed onto the rear of the plug barrel part 86. The rear backshell 82 is screwed onto the rear end of the middle shell. Grommets such as 110 will have been already threaded onto the cables 32, 34 and will be pressed into the insides of the backshells, as shown in FIG. 4. The shell assembly 70 does not affect the optical coupling of the fibers or the plex connectors, and only seals to the cables extending from the plex connectors. However, the shell assembly provides a sealed environment for the plex connectors and provides protection against physical damage to the plex connector assembly. The middle shell has an outer flange 150 with holes, that can be mounted on a panel.

While the plex housing 12 is typically formed of molded plastic, the middle shell 72 is preferably formed of metal (e.g. stainless steel). The backshells 80, 82 can be formed of high strength polymer. The greater thickness of the walls of the backshells 80, 82, than the walls 152 of the plex connector, results in increased strength.

Thus, the invention provides an optical fiber connector system which uses a simple and versatile plex system for optical connections but which uses a shell assembly to protect the plex system from dust, vapors, etc. that might seep in and to protect the plex system from physical damage by being struck, crushed, etc. The shell assembly includes a middle shell with an internal flange that closely receives the plex housing and which is similar to a panel to which the plex housing can directly latch. Backshells extending in front and rearward direction from the middle shell, extend to optical cable portions remote from the plex connectors and provide elastomeric grommets that seal to the cables.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optic fiber connector system which comprises a housing that has at least one through bore with front and rear longitudinally spaced opposite ends, said bore ends constructed to each receive and latch to a pair of mating optic fiber connectors wherein each connector includes a frame with a through passage, a terminus lying in the through passage, and an optic fiber cable with a fiber that extends through the through passage, comprising:

an assembly of a plurality of shells that lies on an axis, said shells including a middle shell that closely receives said housing, and front and rear backshells that are each sealed with respect to said middle shell and that extend forward and rearward, respectively, from said middle shell;

elastomeric grommets that each lies in one of said backshells, each grommet having a periphery sealed to one of said backshell and each having a middle sealed to one of said optical cables.

2. The connector system described in claim 1 wherein:
said assembly of shells includes said front and rear backshells with cylindrical threaded ends and said middle shell with cylindrical front and rear threaded ends threadably coupled to said backshell ends, said middle shell having an internal flange, said flange having front and rear surfaces, and said housing forming a pair of shoulders abutting said front and rear flange surfaces.

3. The connector system described in claim 2 wherein:
said housing has a rectangular cross-section, when viewed along said front and rear directions, said middle flange has a cylindrical middle portion, and said internal flange has a cylindrical radially outer end and has a rectangular through passage that closely receives said housing.

4. The connector system described in claim 2 including:
a plurality of seals that seal said front and rear ends of said middle shell to said front and rear backshells.

5. An optic fiber connector system which comprises a plex housing which has at least one through bore with front and rear longitudinally spaced opposite ends, said bore ends constructed to receive and latch to optic fiber plex connector assemblies, and a pair of said plex connector assemblies that each includes a plex connector comprising a plex frame with a through passage and a terminus lying in the through passage, and each said plex connector assembly also including an optic fiber cable with a fiber that extends through the through passage, comprising:

a middle shell which has a passage that closely receives said housing, said middle shell having front and rear ends;

front and rear backshells that extend respectively forwardly and rearwardly from said middle shell and that are each sealed with respect to said middle shell;

front and rear cable each lying in one of said backshells and sealed to one of said optic fiber cables.

6. The connector system described in claim 5 wherein:

said middle shell has externally threaded front and rear ends, and said backshells have internally threaded ends, said rear backshell having a threaded front end that is threadably engaged with said middle shell threaded rear end;

said front backshell includes a plug barrel part with a front portion that fits into said middle shell front end, said plug barrel part having a forwardly-facing shoulder, and said front backshell having a hollow coupling nut which has an internally threaded rear end that threadably engages said middle shell front end, said coupling nut having a front end with a rearwardly-facing shoulder that abuts said plug barrel forwardly-facing shoulder, whereby to enable disassembly without having to turn the front backshell and the frontmost optic fiber cable.

* * * * *